United States Patent [19]

Haeusler

[11] 4,403,886
[45] Sep. 13, 1983

[54] NOVEL MORTISE-AND-TENON TYPE JOINT FOR FURNITURE

[76] Inventor: Roland Haeusler, 14 rue Adrien Damalix, 94410 St Maurice, France

[21] Appl. No.: 355,111

[22] Filed: Mar. 5, 1982

[30] Foreign Application Priority Data

Mar. 10, 1981 [FR] France .............................. 81 04746

[51] Int. Cl.³ .......................... F16B 1/00; F16D 1/00; F16D 3/00
[52] U.S. Cl. .................................. 403/217; 403/293; 403/379; 211/182; 211/189
[58] Field of Search .............. 403/218, 217, 231, 293, 403/292, 339, 340, 176, 361; 312/111; 108/111, 114; 211/182, 189; 52/236.7, 236.9

[56] References Cited

U.S. PATENT DOCUMENTS

| | | | |
|---|---|---|---|
| 904,603 | 11/1908 | Crocker | 403/340 |
| 1,127,002 | 2/1915 | Hincher | 211/182 X |
| 2,018,539 | 10/1935 | Welsh | 403/218 |
| 4,130,971 | 12/1978 | Herrig | 108/111 X |
| 4,270,872 | 6/1981 | Kiyosawa | 403/170 |

*Primary Examiner*—Wayne L. Shedd
*Attorney, Agent, or Firm*—Frost & Jacobs

[57] ABSTRACT

A mortise-and-tenon joint for assemblying three or more components. The mortise receives a pair of opposed tenons with their end surfaces in contact inside the mortise. The tenons are in substantially play-free mating engaging with the mortise and are substantially of the same volume as the mortise. In one embodiment the tenons are right trapezoidal in contact along their inclined surfaces of equal slope. In another embodiment there are two pairs of tenons for each mortise which comprises a pair of cylindrical cavities. Threaded fasteners extending through appropriate hole with internally threaded bushes and apertures in the tenons and through the mortise secure the assembled joints.

13 Claims, 5 Drawing Figures

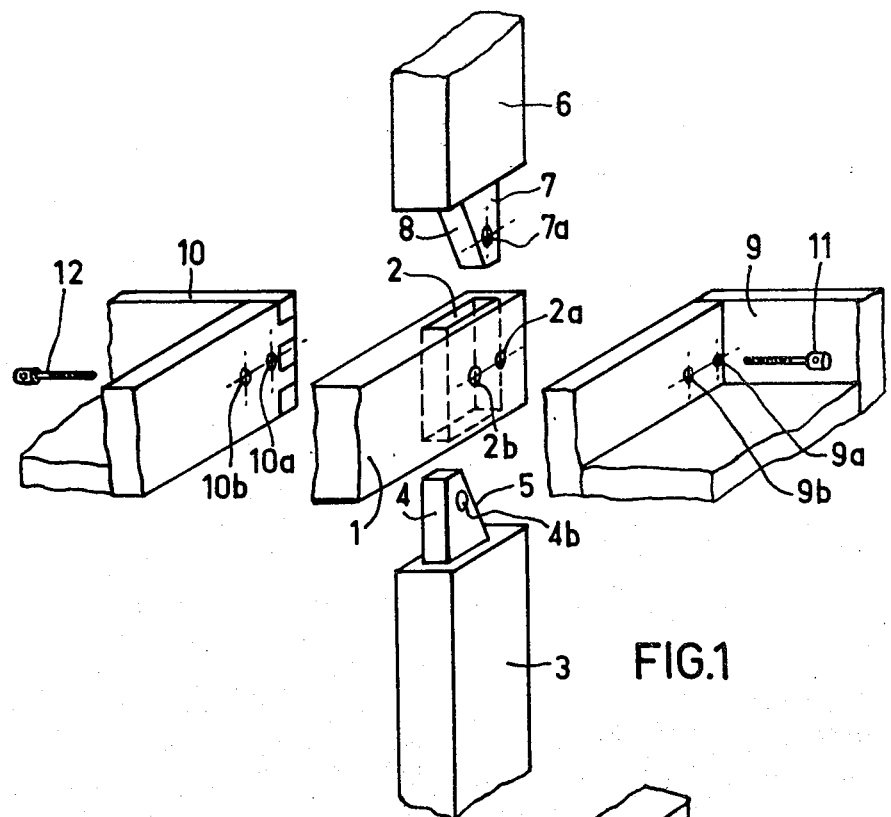
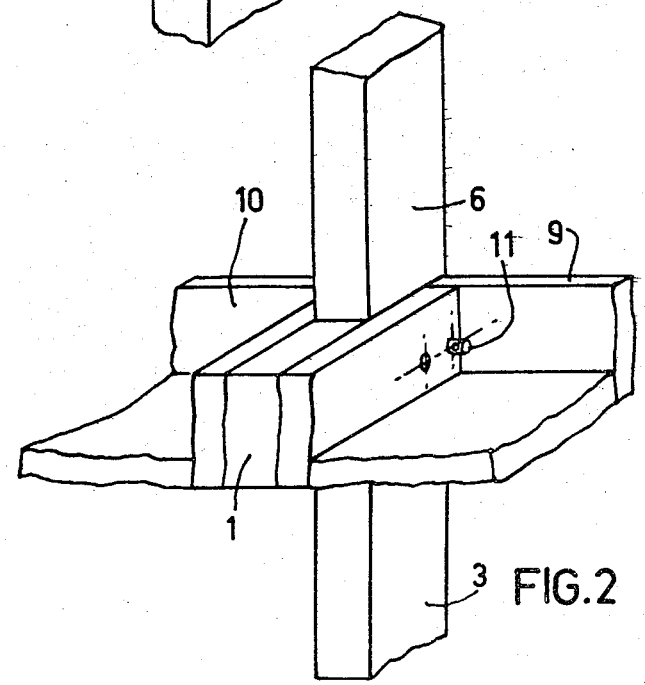
FIG.1
FIG.2

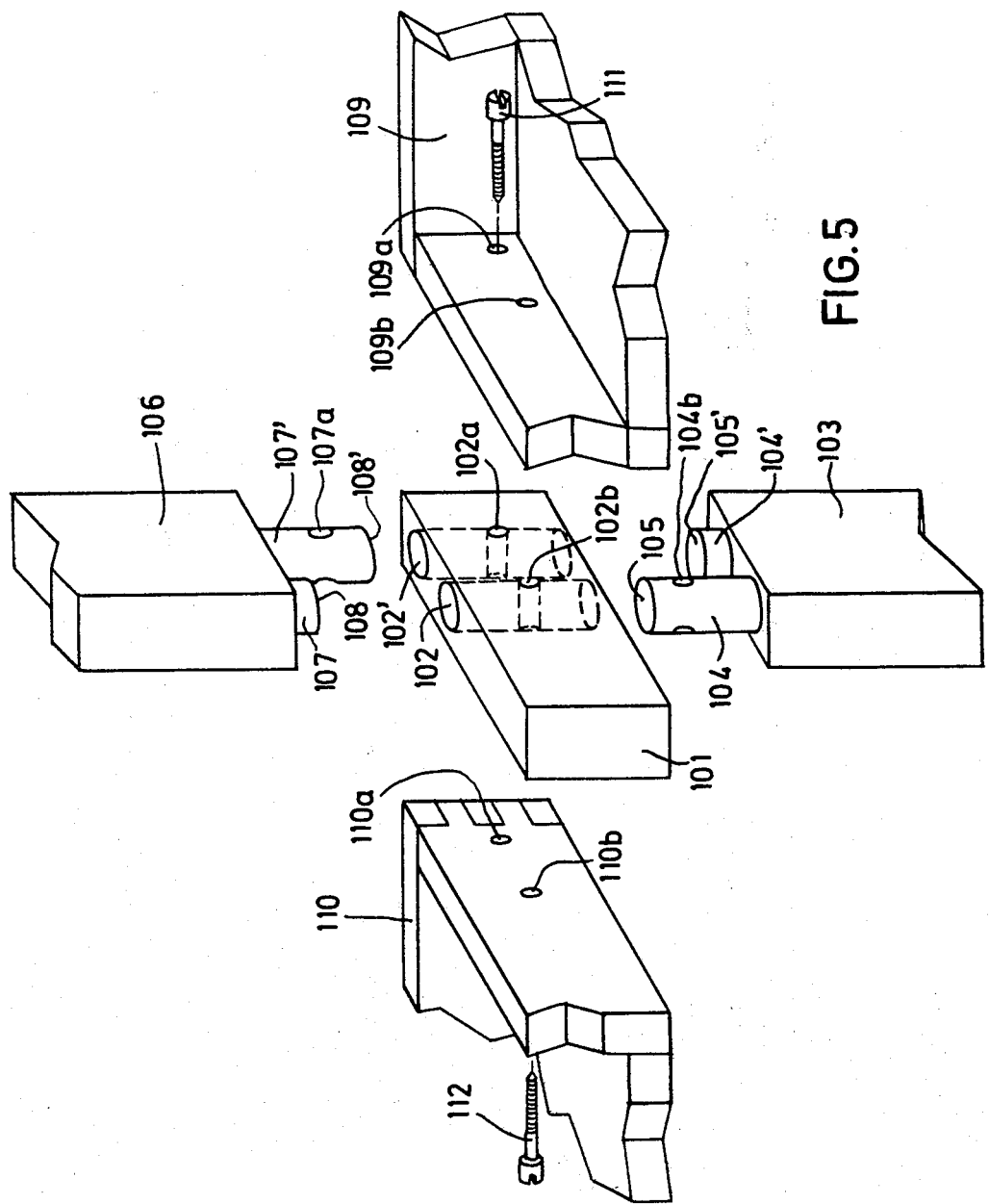

NOVEL MORTISE-AND-TENON TYPE JOINT FOR FURNITURE

BACKGROUND OF THE INVENTION

The present invention relates to the field of mortise-and-tenon type joints. Such joints are particularly advantageous for joining wood parts or components, for example, in making pieces of furniture of all kinds namely, bookcases, shelving, free-standing closets, and the like. It goes without saying, however, that the invention is useful for parts or components made of materials other than wood, in particular, metal or plastic components.

Mortise-and-tenon type joints are well known in the art. They are widely used in wood constructions in particular. It is important, however, to find improvements in this basic system in order to provide precision assemblies and connect parts or components in various planes. It is for example particularly desirable for making three-dimensional joints.

OBJECT AND SUMMARY OF THE INVENTION

An object of the invention is to provide a mortise-and-tenon type joint system which permits components to be assembled reliably and with precision and even in planes at right angles to one another.

According to the invention there is provided a mortise-and-tenon type joint system for assemblying three or more components together, the mortise-and-tenon joint system comprising mortise means defining at least one cavity means formed in a first component and at least one pair of tenon means formed on two other components, respectively. The cavity means and tenon means are of mating configuration. The pair of tenon means is received in the cavity means in opposed relation with a mutual contact surface inside the cavity means. The volume of the pair of tenon means is substantially equal to the internal volume of the cavity means.

For practical purpose it is most often sufficient to provide one mortise means with one or two cavity means each accommodating a pair of tenon means.

The configuration of the cavity means may be as desired, for example, cylindrical or prismatic. Thus, the section of the mortise means may be curved, advantageously circular, or polygonal with straight sides or with both arcuate, preferably circular, and straight sides. The tenon means of course have to be of the same section as the cavity means in which they are received for joining the components.

The pair of tenon means provided on the other two components, respectively, are inserted into the cavity means so that the end surfaces of the tenon means are in contact inside the cavity means.

If the cavity means is cylindrical, and therefore the tenon means are also cylindrical, the end surfaces of said pair of tenon means abut against each other their contact surface then being contained in a plane perpendicular to the axis of said cavity means or inclined relative thereto.

According to a preferred embodiment of the invention, the mortise-and-tenon type joint system comprises mortise means defining a single through passage of parallelepipedic configuration, each of said pair of tenon means being of right trapezoidal prism having inclined sides of equal slope, the volumes of each of said pair of tenon means being substantially equal to one half of the effective volume of said cavity means, and whereby upon insertion into said cavity means said inclined surfaces of said tenon means bear against each other.

If, as is often the case, it is desirable to add additional components in a plane perpendicular to the central plane of the mortise means, each of said tenon means may be provided with a transverse hole and said mortise means being provided with two holes in registration with the holes in said tenon means when the joint is assembled. Each additional components having two apertures, one in alignment with the hole through the mortise means and the corresponding tenon means thereby forming a transverse passageway, connecting means being accommodated in each one of said transverse passageways.

According to a preferred embodiment, the connecting means comprises a threaded fastener cooperating with a complementarily internally threaded bush or insert disposed in each of the holes in the tenon means.

Alternatively, when the use of such internally threaded bushes in the tenon means is not necessary, the connecting means may comprise a threaded fastener extending through said transverse passageway having a nut at one end.

According to the invention the pair of tenon means are fitted in said mortise means without any play on assembly, particularly when the tenon means are of right trapezoidal configuration. The pair of tenon means are inserted head-to-tail alongside each other along the entire length of the mortise means. A very reliable precision joint for three parts or components is thus obtained in a simple manner.

BRIEF DESCRIPTION OF THE DRAWINGS

The invention will now be illustrated, though in no way restrictive, by the description of various embodiments with reference to the accompanying drawings:

FIG. 1 is an exploded perspective view, upside down, showing the joint system before assembly;

FIG. 2 is a view corresponding to FIG. 1 of the joint system assembled;

FIG. 5 is an exploded perspective view, upside down, of an alternative embodiment of the joint system.

DESCRIPTION OF THE PREFERRED EMBODIMENTS

Figure 3:
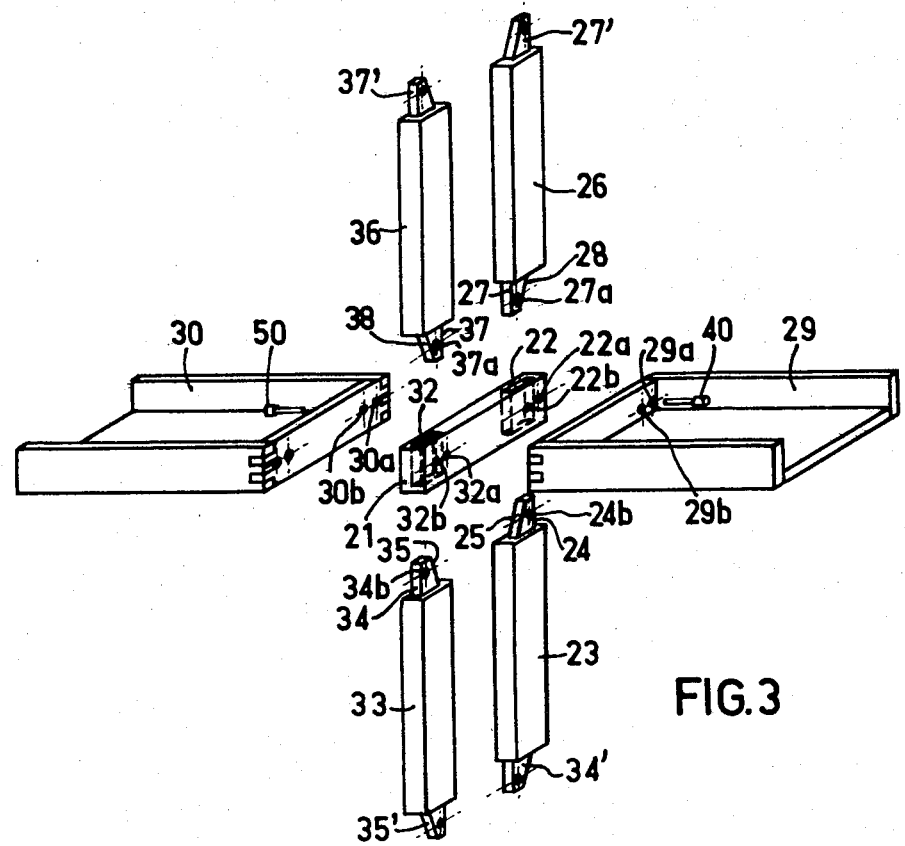
FIG. 3 is an exploded perspective view, upside down, showing the use of the joint system of FIGS. 1 and 2 for furniture.

In the embodiment of FIGS. 1 and 2, the components or parts to be joined or assembled are designed by reference numerals 1, 3, 6, 9 and 10. In this particular embodiment the components or parts are made of wood. The component 1 comprises a mortise 2 of parallelepipedic configuration (of rectangular cross section in this particular embodiment). Transverse holes 2a, 2b extend through the component 1 including the mortise 2.

Component 3 and component 6 respectively have a tenon 4 and a tenon 7. The volume of each of the tenons is substantially equal to half the effective volume of the mortise 2. The configuration of the tenons 4 and 7 constitutes one of the important feature of this embodiment of the invention. As shown in the drawing, the tenons are of prismatic configuration with a pair of right trapezoid lateral surfaces. The inclined surfaces 5 and 8 defined between the inclined sides of the right trapezoidal lateral surfaces have equal slopes in magnitude and direction. Moreover, the tenon 4 has a transverse hole 4b which in this illustrated embodiment is adapted to receive a metal threaded bush or insert. Likewise the tenon 7 comprises a hole 7a adapted to receive a threaded bush or insert.

The assembly of the components 3 and 6 on component 1 is carried out by engaging the respective tenons 4 and 7 of components 3 and 6 into mortise 2. The arrangement is such that the inclined surfaces 5 and 8 of the tenons 4 and 7 bear against each other inside the effective volume of the mortise 2. During assembly the holes 2a and 2b through the component 1 and its mortise 2 come into registration with the holes 7a and 4b in the components 3 and 6.

In the embodiment of FIG. 1 the assembly of not only components 3 and 6 on component 1 is illustrated but also components 9 and 10 which are disposed in a plane perpendicular to the general plane of the component 1. Component 9 comprises two apertures 9a and 9b and component 10 comprises two corresponding apertures 10a and 10b. Threaded fasteners or studs 11 and 12 which are shown diagrammatically are the connecting means necessary for securing the joint. As is seen, the threaded fastener 11 extends through aperture 9a in component 9 and hole 2a through mortise 2 before threadedly mating with the internally threaded bush in the hole 7a in the tenon 7 of the component 6. Likewise, the threaded faster 12 extends through aperture 10b and hole 2b and threadedly engages the internally threaded bush in the hole 4b.

FIG. 2 is a perspective view which shows the components 1, 3, 6, 9 and 10 in their assembled position thereby defining a joint.

In the foregoing embodiment the case in which the internally threaded bushes are in the holes of the tenons and receive the shanks of threaded fasteners. It goes without saying that the invention also covers arrangements in which the joint is secured by threaded fasteners extending through the apertures in components 9 and 10, and the holes through the mortise 2 and the tenons 5 and 7 threadedly engage nuts at one of their ends. The embodiment with the internally threaded bushes in the tenon holes is preferred when the components are made of wood and are to be joined with precision.

Figure 4:
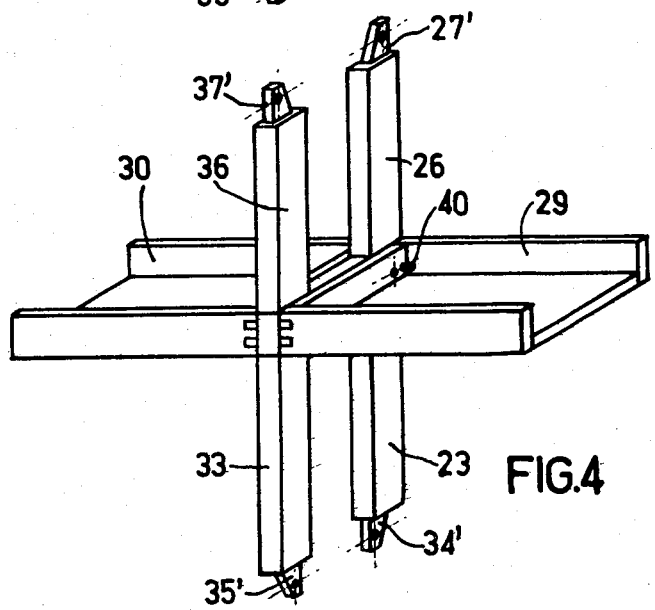
FIG. 4 is a view similar to that of FIG. 3 with the components or parts assembled.

FIGS. 3 and 4 illustrate the application of the joints according to the invention for making pieces of furniture, for example, shelving or bookcases.

As illustrated in FIG. 3 a component 21 is joined to pairs of components 23,33 and 26,36 and two shelf components 29 and 30.

Component 21 comprises two mortises 22,32 with respective transverse holes 22a,22b and 32a,32b. In the lower part of FIG. 3 components 23 and 33 are shown each comprising a tenon of the same structure and configuration as described and illustrated above with reference to FIGS. 1 and 2. Thus, component 23 comprises a trapezoidal tenon 24 adapted to be accommodated in the mortise 22. Similarly, component 33 comprises a trapezoidal tenon 34 adapted to be accommodated in mortise 32. The tenons 24 and 34 are respectively fitted with internally threaded bushes 24b and 34b. As shown in FIG. 3, the components comprise at their other ends tenons 34' and 35' which advantageously are identical to tenons 24 and 34.

The configuration of components 26 and 36 is similar to that of components 23 and 33. They comprise at one end tenons 27 and 37 fitted with internally threaded bushes 27a,37a, respectively. At their other end they have tenons 27', 37'. During assembly the inclined surfaces 25 and 28 of the trapezoidal tenons 24 and 27 come into position opposite each other, bearing against each other inside the mortise 22. This also applies to the inclined surfaces 35 and 38 of the trapezoidal tenons 34 and 37 which bear against each other inside the mortise 32. In this joint the internally threaded bush 24b comes precisely into alignment with hole 22a, internally threaded bush 27a comes into alignment with hole 22b internally threaded bush 37a is aligned with hole 32a and internally threaded bush 34b is aligned with hole 32b.

In a plane perpendicular to the plane containing component 21 and the two pairs of components 23,33 and 26,36 two shelf components 29,30 are joined as illustrated. Each of the shelf components 29,30 has two pairs of apertures. The arrangement and function of one pair of the apertures will now be described, the other being identical. Shelf component 29 comprises, for example, apertures 29a,29b adapted to form a transverse passageway with holes 22a,22b through the mortise 22. Apertures 30a,30b in the shelf component 30 are arranged in registration and alignment. In the illustrated embodiment the connecting means are threaded fasteners 40 and 50 which are respectively threadedly engaged with the internally threaded bushes provided in the corresponding tenons.

Once the joint is formed the components are as illustrated in FIG. 4.

To facilitate the perspective view the drawings of FIGS. 1 and 2 the under sides of the components 9 and 10 which are normally hiden are shown. This is likewise the case for components 20 and 30 in FIGS. 3 and 4. It will be noted that during fabrication of such a piece of furniture the connecting means are preferably hiden by the corresponding components, such as components 9,10 and 29,30.

FIG. 5 illustrates in an exploded perspective view, upside down, in the same manner as FIG. 1, an alternative embodiment of the joint system of the invention. In this embodiment the mortise provided in component 101 comprises two cavities 102,102'. In the illustrated and described embodiment the housings 102,102' are cylindrical with a circular section, it goes without saying that other configurations or sections could be also used. Each cavity 102,102' is traversed by transverse holes 102b,102a extending through the component 101.

Component 103 comprises tenons 104 and 104' of cylindrical configuration corresponding to that of cavities 102 and 102'. Tenon 104 comprises a hole 104b which may receive an internally threaded metal bush. The end surfaces of the tenons 104 and 104' are designed by reference numerals 105 and 105' respectively.

Similarly component 106 comprises tenons 107 and 107' of cylindrical configuration corresponding to that of cavities 102 and 102'. Tenon 107' has a hole 107a which may receive an internally threaded metal bush. The end surfaces of tenons 107 and 107' are designed by reference numerals 108 and 108' respectively.

On assembly the tenons 104 and 107 are inserted into housing 102 and their end faces 105 and 108 contact each other inside cavity 102. The total volume of the tenons 104 and 107 substantially corresponds to the internal volume of the cavity 102. Once the joint is finished the hole 104b in tenon 104 is in alignment with hole 102b. Similarly, tenons 104' and 107' are inserted into cavity 102' and their end surfaces 105' and 108' are in contact inside the cavity 102'. The total volume of the tenons 104' and 107' substantially corresponds to the internal volume of the cavity 102'. For a precision joint, a symmetrical arrangement has been adapted for component 103 complementary to that of component 106. Thus, the pairs of tenons 104,107 and 104', 107' are constructed as shown in FIG. 5, but it will be noted that any other arrangement may be adopted provided that the total volume of the pairs of tenons substantially corresponds to that of the associated cavity. Once the joint is assembled the hole 107a in the tenon 107' is in alignment with the hole 102a.

Also shown in FIG. 5 are two components 109 and 110 to illustrate an assembly in two planes at right angles to each other.

Component 109 has two apertures 109a and 109b and component 110 has two apertures 110a and 110b. Threaded fasteners 111 and 112 are shown which are representative of the connecting means necessary for securing the joint. The threaded fastener 111 extends through aperture 109a in component 109 and the hole 102a through cavity 102' before threadedly engaging the internally threaded bush housed in hole 107a in tenon 107' of component 106. Likewise the threaded fastener 112 extends through aperture 110b and hole 102b and threadedly engages the internally threaded bush in the hole 104b in the tenon 104 of component 103.

In the absence of such metal bushes in holes 107a and 104b it would be sufficient of course to provide for securement of the joint with the threaded fastener a nut at one end, as mentioned above with reference to the FIG. 1 embodiment.

One skilled in the art will notice that the invention offers a general joint system for the construction of the most varied kinds of furniture. It is naturally advantageous for modular design furniture where the person putting the furniture together has components of predetermined dimensions provided to him.

In the embodiment of FIGS. 3 and 4 it is also seen that the tenons 34', 35' of the components 23 and 33 and the tenons 27' and 37' of components 26 and 36 permit assembly of a series of similar components. The possibilities of joints are therefore most varied.

It was indicated above that the invention offers more advantages for joints for wood components. Up to now mortise-and-tenon joints for wood components or parts did not offer adequate precision. The invention provides, on the contrary, means to construct reliable precision joints.

Obviously the invention may be carried out with materials other than wood, for example, components made of plastic or metal.

What is claimed is:

1. A mortise-and-tenon type joint system for assemblying three or more components together, said mortise-and-tenon joint system comprising mortise means defining at least one cavity means formed in a first component and a pair of tenon means formed on two other components, respectively, said cavity means and tenon means being of mating configuration, said pair of tenon means being received in said cavity means in opposed relation with a mutual contact surface inside said cavity means, and the volume of said pair of tenon means being substantially equal to the internal volume of said cavity means.

2. The joint system of claim 1, wherein said mortise means comprises a single cavity means for said pair of tenon means.

3. The joint system of claim 1, wherein said mortise means comprises two cavity means for two said pairs of tenon means.

4. The joint system of claim 1, wherein each said cavity means is of prismatic configuration.

5. The joint system of claim 4, wherein the section of each said cavity is polygonal.

6. The joint system of claim 1, wherein each said cavity means is of cylindrical configuration.

7. The joint system of claim 6, wherein the section of each said cavity is circular.

8. The joint system of claim 1, wherein said mutual contact surface is defined by free ends of said pair of tenon means abutting against each other, said mutual contact surface lying in a plane perpendicular to the axis of said cavity means.

9. The joint system of claim 1, wherein said mutual contact surface is defined by free ends of said pair of tenon means abutting against each other, said mutual contact surface lying in a plane inclined relative to the axis of said cavity means.

10. The joint system of claim 1, wherein said cavity means is of parallelepipedic configuration, each of said pair of tenon means being of prismatic configuration having right trapezoidal lateral sides defining an inclined side, said inclined sides of said pair of tenon means having the same slope, the volume of each of said tenon means being substantially equal to half the volume of said cavity means.

11. The joint system of claim 1, also assembling additional components lying substantially in a plane perpendicular to the general plane of said cavity means, and comprising a transverse hole extending through each of said tenon means and two holes extending through said mortise means and respectively in registration with the holes in said tenon means when the joint is assembled, each of said additional components having two apertures, each of said apertures being in alignment with one of said holes through said mortise means and said hole in one of said tenon means thereby defining a transverse passageway, and connecting means received in each of said transverse passageways for securing said joint assembly.

12. The joint assembly of claim 11, wherein said connecting means comprise a threaded fastener cooperating with a complementary internally threaded bush disposed in said holes of the associated tenon means.

13. The joint system of claim 11, wherein said connecting means comprise a threaded fastener extending through its associated transverse passageway and cooperating with a nut at one end thereof.

* * * * *